US012421929B2

(12) United States Patent
Schumann

(10) Patent No.: US 12,421,929 B2
(45) Date of Patent: Sep. 23, 2025

(54) IGNITION CIRCUIT FOR A COMBUSTION ENGINE

(71) Applicant: Andreas Stihl AG & Co. KG, Waiblingen (DE)

(72) Inventor: Florian Schumann, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 317 days.

(21) Appl. No.: 18/165,763

(22) Filed: Feb. 7, 2023

(65) Prior Publication Data

US 2023/0250789 A1 Aug. 10, 2023

(30) Foreign Application Priority Data

Feb. 8, 2022 (EP) .................................... 22155636

(51) Int. Cl.
*F02P 5/15* (2006.01)

(52) U.S. Cl.
CPC ........... *F02P 5/1504* (2013.01); *F02P 5/1508* (2013.01)

(58) Field of Classification Search
CPC .............................. F02P 5/1504; F02P 5/1508
See application file for complete search history.

(56) References Cited

U.S. PATENT DOCUMENTS

| | | | | |
|---|---|---|---|---|
| 3,867,916 | A * | 2/1975 | Bigalke | F02P 5/155 123/406.44 |
| 4,492,195 | A * | 1/1985 | Takahashi | F02D 31/003 123/680 |
| 5,447,131 | A | 9/1995 | Nickel et al. | |
| 5,884,605 | A * | 3/1999 | Nagaishi | F02P 5/1504 123/406.24 |
| 6,604,505 | B2 * | 8/2003 | Hellmich | F02M 63/06 123/295 |
| 6,976,472 | B2 * | 12/2005 | Nickel | F02P 5/1508 123/406.47 |
| 7,536,983 | B2 | 5/2009 | Layher et al. | |
| 2005/0011494 | A1 | 1/2005 | Nickel | |
| 2008/0022958 | A1 * | 1/2008 | I | F02D 41/08 123/179.3 |
| 2012/0297631 | A1 * | 11/2012 | Kunert | F02P 5/02 123/406.51 |
| 2023/0250789 | A1 * | 8/2023 | Schumann | F02P 5/1504 123/406.25 |

* cited by examiner

*Primary Examiner* — George C Jin
(74) *Attorney, Agent, or Firm* — Walter Ottesen, P.A.

(57) ABSTRACT

The disclosure is directed to an ignition circuit for a combustion engine. The combustion engine has a piston movable between a top dead center and a bottom dead center and, via a connecting rod, drives a crankshaft. Combustion air is apportioned via an intake channel. A control circuit provides an ignition time for the idling situation and an ignition time for the acceleration situation. To adjust an early switch to an ignition time for the acceleration situation, provision is made to monitor the rotational speed of the crankshaft over a crankshaft angle range and to detect the value of a drop in rotational speed. The value of the detected drop in rotational speed is compared to a predetermined value of a drop in rotational speed and, when the predetermined value of the drop in rotational speed is exceeded, a switch is made to the ignition time for the acceleration situation.

13 Claims, 3 Drawing Sheets

IGNITION CIRCUIT FOR A COMBUSTION ENGINE

CROSS-REFERENCE TO RELATED APPLICATIONS

This application claims priority of European patent application no. 22 155 636.8, filed Feb. 8, 2022, the entire content of which is incorporated herein by reference.

TECHNICAL FIELD

The disclosure relates to an ignition circuit for a combustion engine, having a spark plug which is arranged in a combustion chamber of the combustion engine. The combustion chamber is delimited by a piston which is moved to and fro between a top dead center and a bottom dead center and, via a connecting rod, rotationally drives a crankshaft. The combustion engine has an intake channel in which a control element is provided for apportioning combustion air, on the one hand, for the idling situation of the combustion engine and, on the other hand, for an acceleration situation of the combustion engine. In the idling situation, a first quantity of combustion air is supplied. In the acceleration situation, a second quantity of combustion air is supplied. The second quantity of the supplied combustion air is larger than the first quantity of the supplied combustion air.

BACKGROUND

An electronic control circuit is used to trigger an ignition spark at the spark plug depending on a crankshaft angle of the crankshaft at an ignition time in order to burn a mixture compressed in the combustion chamber. The ignition time can be changed by the ignition circuit depending on the operating state (idling situation, acceleration situation) of the combustion engine, the control circuit being provided at least with an ignition time for the idling situation and at least an ignition time for the acceleration situation.

In the idling situation of the combustion engine, a "retarded" ignition time is often set. Furthermore, during idling, the combustion of the mixture in the combustion chamber is irregular and frequently inefficient from cycle to cycle. The idling is controlled in such a manner that as small rotational speed fluctuations as possible occur.

In the acceleration situation, the ignition time is adjusted in particular to "advanced" in order to achieve efficient combustion of the compressed mixture and therefore good acceleration and a rapid increase in the rotational speed.

The rotational speed of the combustion engine is increased by changing the supplied quantity of combustion air and by an increased supply of fuel, for which purpose at least the control element provided in the intake channel is adjusted in order to apportion combustion air. For an acceleration, the control circuit will expediently switch over the ignition time from, for example, "retarded" to expediently "advanced". For this purpose, it is known to monitor the increase in the rotational speed of the combustion engine so that the control circuit sets an "advanced" ignition time as soon as, because of the opening of the throttle flap, a rise in rotational speed beyond a predetermined rotational speed value occurs and can be determined by the ignition circuit.

The "retarded" ignition time set in the idling situation and the associated inefficient combustion have, however, the disadvantage that, when the operating state changes from idling into the acceleration situation, the rotational speed of the combustion engine increases only slowly. Only if the rotational speed of the combustion engine exceeds the predetermined limit value of a rotational speed does the control circuit switch over to an "advanced" ignition time for the acceleration. The combustion engine accelerates slowly and with a delay.

SUMMARY

The disclosure is based on an object of configuring an ignition circuit for a combustion engine in such a manner that the combustion engine powerfully and rapidly accelerates from idling. Furthermore, a method for early switching over of the ignition time to the acceleration situation is intended to be specified.

An ignition switch according to the disclosure is provided for a combustion engine having a spark plug which is arranged in a combustion chamber of the combustion engine, wherein the combustion chamber is delimited by a piston which is moved to and fro between a top dead center and a bottom dead center and, via a connecting rod, drives a crankshaft, and an intake channel with a control element for apportioning combustion air for an idling situation and an acceleration situation of the combustion engine. Furthermore, an electronic control circuit is provided which is configured to trigger an ignition spark at the spark plug depending on a crankshaft angle of the crankshaft at an ignition time, wherein the control circuit is provided at least with an ignition time for the idling situation and at least with an ignition time for the acceleration situation in order, in the idling situation, to set the predetermined ignition time over the idling situation. The control circuit is configured in order, in the idling situation of the combustion engine, to monitor the course of a rotational speed of the crankshaft over at least one predetermined crankshaft angle range, and, in the idling situation, to detect a drop, occurring within the predetermined crankshaft angle range, in the rotational speed of the crankshaft as a value in order to compare the value of the detected drop in rotational speed with a predetermined value of a drop in rotational speed. If the predetermined value of the drop in rotational speed is exceeded, a switch is immediately made to the ignition time for the acceleration situation.

In a method for early switching over of an ignition time in a spark-ignition combustion engine having a spark plug, which is arranged in a combustion chamber of the combustion engine, and having a piston which compresses a fuel/air mixture, supplied to the combustion chamber, on its way from a bottom dead center to a top dead center, wherein the supplied combustion air is apportioned with a control element via an intake channel depending on the operating state of the combustion engine, provision is made, in the idling situation of the combustion engine, to detect a drop in rotational speed occurring in the compression stroke and to compare the detected drop in rotational speed with a predetermined drop in rotational speed. If the detected drop in rotational speed exceeds the predetermined drop in rotational speed, a switch is immediately made to an ignition time for the acceleration situation.

In the idling situation of the combustion engine, the current rotational speed is monitored over a predetermined crankshaft angle range. Within the predetermined crankshaft angle range, a drop in rotational speed of the crankshaft that occurs is detected as a value. This can take place, for example, in that the current rotational speed of the crankshaft is detected at the start of the crankshaft angle range and the current rotational speed of the crankshaft is detected at the end of the crankshaft angle range, and the control circuit is configured in particular to ascertain the magnitude of the difference between the two detected values as the drop in rotational speed.

The value of the ascertained drop in rotational speed is compared with a predetermined value of a drop in rotational speed, wherein, if the predetermined value of the drop in rotational speed is exceeded, the control circuit preferably switches over immediately to an ignition time for the acceleration situation.

The rapid switching over to an ignition time for the acceleration situation, in particular to an "advanced" ignition time, brought about by the control circuit depending on the drop in the rotational speed of the crankshaft in the compression stroke of the combustion engine brings about a significantly better acceleration of the combustion engine to a higher rotational speed. In comparison to the prior art, in which the switch to the ignition time for the acceleration situation is made only after an increase in speed established because of the opening of the throttle flap, according to the subject matter of the disclosure a switch of the ignition time to the acceleration situation, advantageously to an "advanced" ignition time, is made even before there is an increase in the rotational speed of the crankshaft of the combustion engine.

According to the disclosure, a more rapid response of the combustion engine to a change in the operating state is achieved, namely from the idling operating state into the acceleration operating state. As soon as there is an increase in the supplied quantity of combustion air by adjustment of the control element (for example a throttle flap) in the intake channel, the control circuit identifies the change in the operating state of the combustion engine in the first compression stroke because of a significant drop in the rotational speed. The significant drop in the rotational speed of the crankshaft is caused by the increased compression work of the piston because of the greater quantity of supplied combustion air. The significant drop in the rotational speed is an indication of the changed operating state of the combustion engine, and therefore the control circuit can ideally already set the ignition time for the acceleration situation for the next compression stroke, that is, can expediently displace the ignition time to "advanced".

There are a plurality of possibilities for determining the acceleration situation by evaluating the drop in rotational speed in a monitored crankshaft range.

Thus, a currently determined drop in rotational speed can be compared directly with a predetermined limit value of a drop in rotational speed. If the determined drop in rotational speed of a working cycle exceeds the predetermined limit value of a drop in rotational speed, a switch is made to the ignition time for the acceleration situation. It may be expedient to form a mean of the current drop in rotational speed from a plurality of working cycles, for example, 2 to 5 working cycles, and to compare it with the predetermined limit value.

A difference in a current drop in rotational speed in the monitored crankshaft angle range from the drop in rotational speed of a preceding working cycle of the monitored crankshaft angle range can also be formed. The difference formed is compared with a predetermined limit value $\Delta n_L$. If the difference formed is greater than the predetermined limit value $\Delta n_L$, a switch is made to the ignition time for the acceleration situation. It may be expedient to provide the drop in rotational speed of a preceding working cycle as a sliding mean and to form the drop in rotational speed from a plurality of preceding working cycles, for example, from 2 to 5, in particular 3 working cycles.

Instead of a predetermined constant limit value as comparison variable, it may be expedient to use a changing limit value. The changing limit value can be formed from a sliding mean of the drop in rotational speeds for more than two working cycles plus a jump in rotational speed of, for example, 1000 RPM. As a result, the comparison is less dependent on the rotational speed when the throttle flap is closed, it being possible for the rotational speed to vary from engine to engine or depending on the idling setting.

The detection of the drop in rotational speed and the comparison for determining a significant drop in rotational speed preferably take place in an extended rotational speed range, which is relevant for idling, of approximately 1500 RPM to 3500 RPM.

The predetermined crankshaft angle range is selected in such a manner that the compression stroke of the combustion engine at least partially lies in the predetermined crankshaft angle range. The crankshaft angle range can advantageously extend over a crankshaft angle of up to 300°. Expediently, the predetermined crankshaft angle range extends over a crankshaft angle of not more than 180° CA. In an embodiment, the predetermined crankshaft angle range, in the rotational direction of the crankshaft, extends at least between the bottom dead center of the piston and at least the top dead center of the piston. The drop in rotational speed caused by the compression work of the piston is at its most pronounced in the crankshaft angle range. In an alternative embodiment, the crankshaft angle range can extend as far as the ignition time of the compressed mixture.

The combustion engine can be a two-stroke engine. In an embodiment, the combustion engine is configured as a four-stroke engine. The two-stroke engine has one compression stroke per crankshaft revolution. The working cycle of a two-stroke engine corresponds to a rotation of the crankshaft over a crankshaft angle of 360°. The four-stroke engine has one compression stroke for every second crankshaft revolution. The working cycle of a four-stroke engine corresponds to a rotation of the crankshaft over a crankshaft angle of 720°.

In an embodiment, the control circuit is configured to detect a drop in rotational speed occurring in a plurality of working cycles of the combustion engine. The control circuit is furthermore configured to derive the value of the predetermined drop in rotational speed from a mean of the detected values of the drops in rotational speed. The predetermined value of the drop in rotational speed, upon the exceeding of which the switch is made to the acceleration situation, can therefore be a sliding value or else a fixedly selected value.

The subject matter of the disclosure also relates to the method for switching over an ignition time in a spark-ignition combustion engine having a spark plug, which is arranged in a combustion chamber of the combustion engine, and a piston which compresses a fuel/air mixture, supplied to the combustion chamber, on its way from the bottom dead center to the top dead center, wherein the supplied combustion air is apportioned with a control element via an intake channel depending on the operating state of the combustion engine. According to the disclosure, in the idling situation of the combustion engine, during a compression stroke a drop in rotational speed occurring is detected and the detected drop in rotational speed compared with a predetermined drop in rotational speed. If the detected drop in rotational speed exceeds the limit value of the predetermined drop in rotational speed, a switch is made to an ignition time for the acceleration situation, for example, to an "advanced" ignition time for the acceleration situation.

Following an increase in the quantity of combustion air supplied for the purpose of accelerating the rotational speed of the combustion engine, the acceleration requirements of the user can be identified as soon as in the first compression stroke of the piston on the basis of the drop in rotational speed occurring and, in accordance with the ignition time, can be adjusted to acceleration. Before the increased quantity in the combustion air supplied—and in particular with an increased quantity of fuel supplied—leads to an increase in the rotational speed of the combustion engine, the acceleration requirements are already identified and the ignition time switched to the acceleration situation.

Expediently, the drop in rotational speed is detected in a crankshaft angle range of up to 300°. The crankshaft angle range is selected in such a manner that it detects at least the bottom dead center of the piston and at least the top dead center of the piston.

It may be practical to form the value of the predetermined drop in rotational speed, which value is predetermined as the threshold value for the switching-over operation, from a mean of the sum of preceding drops in rotational speed. The predetermined value of the drop in rotational speed can therefore be a sliding value or else a fixedly selected value.

BRIEF DESCRIPTION OF DRAWINGS

The invention will now be described with reference to the drawings wherein.

DETAILED DESCRIPTION

Figure 1:
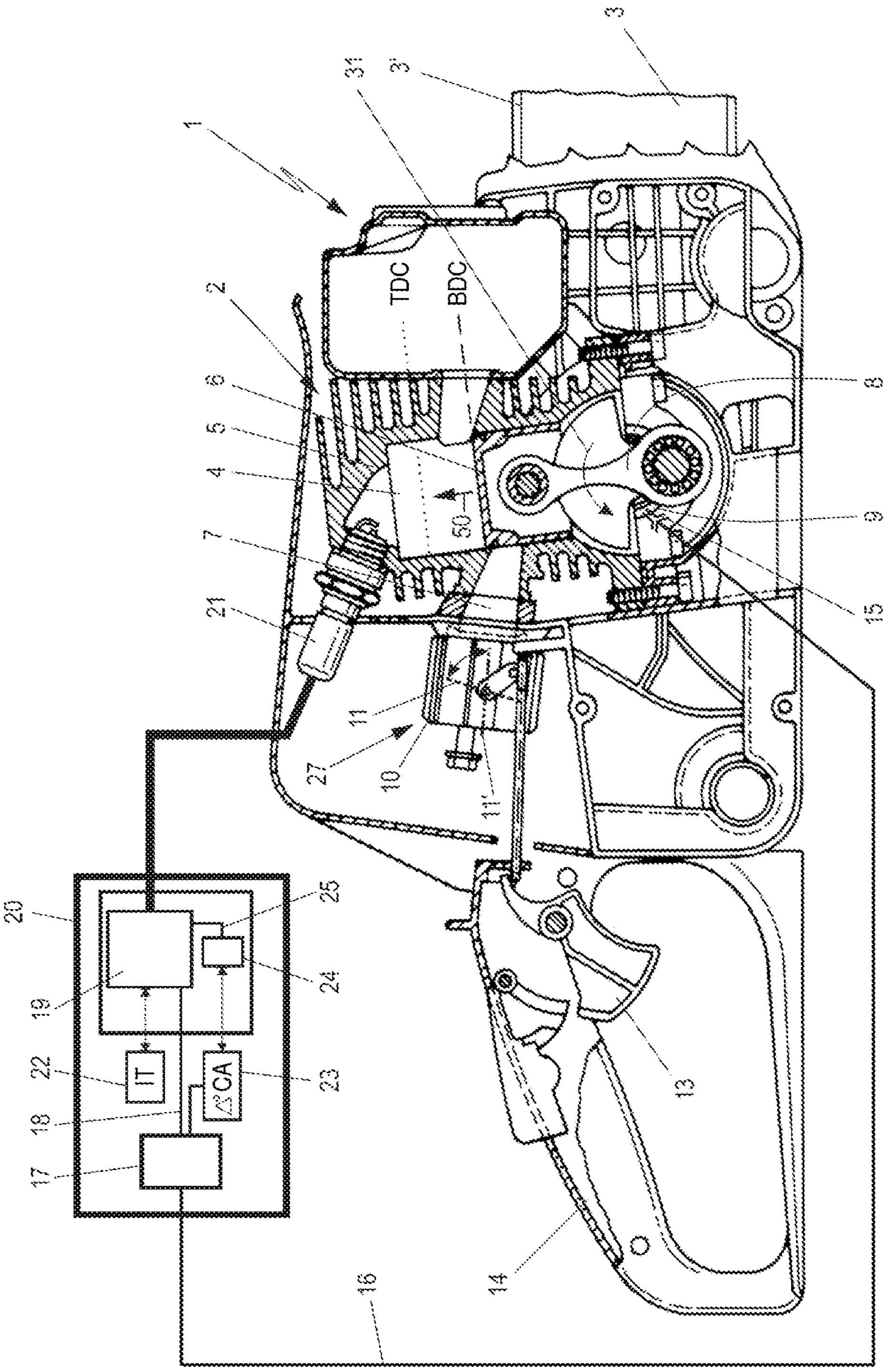
FIG. 1 shows a schematic section through a work apparatus having a combustion engine and an ignition circuit according to the disclosure.

FIG. 1 shows a work apparatus 1 with a combustion engine 2. In the embodiment, the work apparatus 1 is a chainsaw with a saw chain 3' revolving on a guide bar 3. The chainsaw is selected as an example from a multiplicity of possible work apparatuses, such as blowers, brush cutters, hedge trimmers or similar handheld, in particular portable, work apparatuses.

The combustion engine 2 illustrated is a two-stroke engine; alternatively, use may also be made of a four-stroke engine, in particular a mixture-lubricated four-stroke engine, as drive for the work apparatus 1. The disclosure below can be used both for two-stroke engines and for four-stroke engines.

The combustion engine 2 has a cylinder 5 with a combustion chamber 4 which is delimited by a piston 6. The piston 6 moves to and fro between top dead center TDC and bottom dead center BDC. The fuel/air mixture sucked in via an intake channel 7 flows into the combustion chamber 4 and is compressed in a compression stroke by the piston 6 moving in direction 50 to top dead center TDC. The compressed mixture is ignited by the spark of a spark plug 21 in the combustion chamber 4, as a result of which the piston 6 moves in accelerated form downward in the direction of bottom dead center BDC. The piston 6 moving to and fro between top dead center TDC and bottom dead center BDC drives, via a connecting rod 8, a crankshaft 9 of the combustion engine 2 rotationally in rotational direction 31. The crankshaft 9 drives a tool of the work apparatus 1, in the present embodiment the saw chain 3' revolving on the guide bar 3.

In one working stroke (cycle), the piston 6 moves from bottom dead center BDC to top dead center TDC and back again to bottom dead center BDC. In the process, the crankshaft rotates by 360° CA.

The rotational speed of the combustion engine 2 is ascertained by the supplied quantity and richness of the fuel/air mixture which is apportioned via a carburetor 10 in the embodiment. Alternatively, the supplied fuel can also be supplied via a fuel valve or an injection valve. To apportion the necessary combustion air, a flap controller can be provided. In the embodiment shown, at least one throttle flap 11, which is illustrated in FIG. 1 by a dashed line in a closed position, is provided in the carburetor 10.

In the idling position of the throttle flap 11, the intake channel 7 is closed by the throttle flap 11. The combustion air necessary for stable idling flows into the intake channel 7 through a small opening in the throttle flap 11 or a bypass and is sucked into the combustion chamber 4 together with fuel as a fuel/air mixture. In the chain-dotted position of the throttle flap 11', the intake channel 7 is completely open, and therefore a large quantity of combustion air for the fuel/air mixture can be sucked into the combustion chamber 4.

The position of the throttle flap 11, 11' can be changed by a positioning element 13 via a lever assembly 12. In the embodiment, the positioning element 13 is held pivotably in the handle 14 of the work apparatus 1. The positioning element 13 can be configured as an accelerator of the combustion engine 2.

The spark plug 21 is controlled by an ignition circuit 20 in order to output an ignition spark depending on the crankshaft angle °CA of the crankshaft 9. The ignition time IT can basically be dependent on the operating state of the combustion engine 2 and of the crankshaft angle ° CA of the crankshaft 9, that is, the actual angular position of the crankshaft 9 and therefore the stroke position of the piston 6.

In order to detect the crankshaft angle ° CA of the crankshaft 9, a sensor 15, which is configured as a rotational speed sensor, can be provided by way of example. The sensor 15 is arranged on the crankshaft 9 and senses the angular position thereof. The combination of the sensor 15 with the crankshaft 9 can be configured in such a manner that, upon rotation of the crankshaft by 1° CA, the sensor 15 in each case outputs an output signal. Over a crankshaft revolution of 360° CA, the sensor 15 then outputs precisely 360 output signals. The output signals of the sensor 15 are supplied via a signal line 16 to an input circuit 17 of the ignition circuit 20. In the input circuit 17, the received output signals from the sensor 15 are used, on the one hand, to ascertain the rotational speed of the crankshaft 9 and, on the other hand, the rotational position of the crankshaft 9, namely the crankshaft angle ° CA of the crankshaft 9. This information is supplied to a control circuit 19 of the ignition circuit 20 via an output 18. The ignition time IT of the spark plug 21 is controlled by the control circuit 19 on the basis of the rotational speed signal and the angular signal.

Advantageously, in the embodiment shown of the control circuit 19, a first ignition time $IT_I$ is provided for the idling situation of the combustion engine 2 and a second ignition time $IT_A$ for an acceleration situation or full load situation of the combustion engine 2. The ignition times $IT_I$ and $IT_A$ are advantageously provided to the control circuit 19 from a memory 22. An ignition time $IT_I$ for the idling can be at 15° CA before TDC to 0° CA before TDC. An ignition time $IT_A$ for an acceleration situation or full load situation can be at 20° CA before TDC to 40° CA before TDC. It may be expedient to provide a plurality of ignition times for the idling situation and a plurality of ignition times for the acceleration situation. In a refinement, ignition characteristics which provide ignition times IT that are adapted depending on the rotational speed of the crankshaft 9 are stored in the memory 22.

Figure 2:
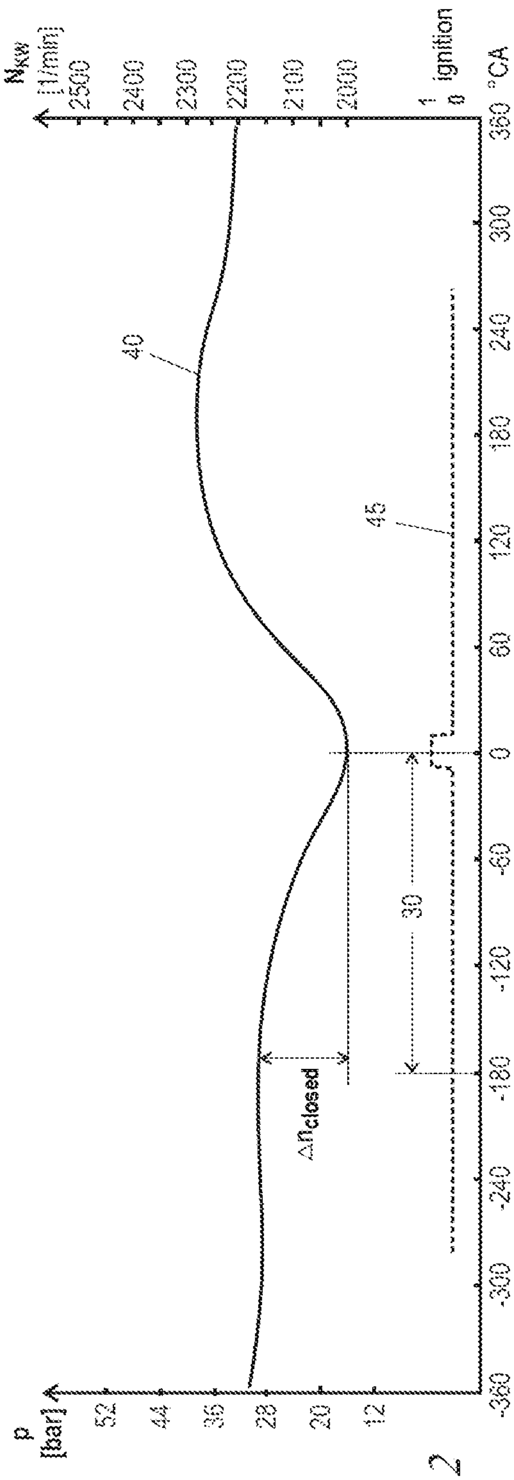
FIG. 2 shows the rotational speed profile of the crankshaft over the crankshaft angle when the throttle flap is closed.

The rotational speed profile 40 in the idling situation of the combustion engine 2 is illustrated in FIG. 2. The idling rotational speed is by way of example between 2000 to 3000 RPM. In the compression stroke of the combustion engine 2, that is, when the piston 6 moves from the bottom dead center BDC in the direction 50 of the top dead center TDC and, in the process, compresses the filling of the fuel/air mixture located in the combustion chamber 4, this leads in general, because of the compression work carried out, to a drop in rotational speed $\Delta_n$ which is illustrated in FIG. 2 as $\Delta_{nclosed}$. Such a drop in rotational speed $\Delta_{nclosed}$ can achieve, for example, the value of 125 RPM. The ignition is schematically reproduced in the dashed-line curve 45 shown below the rotational speed profile 40. A retarded ignition time is provided in the idling situation. Around the region of the top dead center TDC, the ignition circuit 20 triggers an ignition spark at the spark plug 21, which leads to ignition of the compressed fuel/air mixture. As can be gathered from the rotational speed profile 40, the rotational speed N of the combustion engine 2 then increases again in order to drop once again during a following compression cycle because of the compression work performed.

Figure 3:
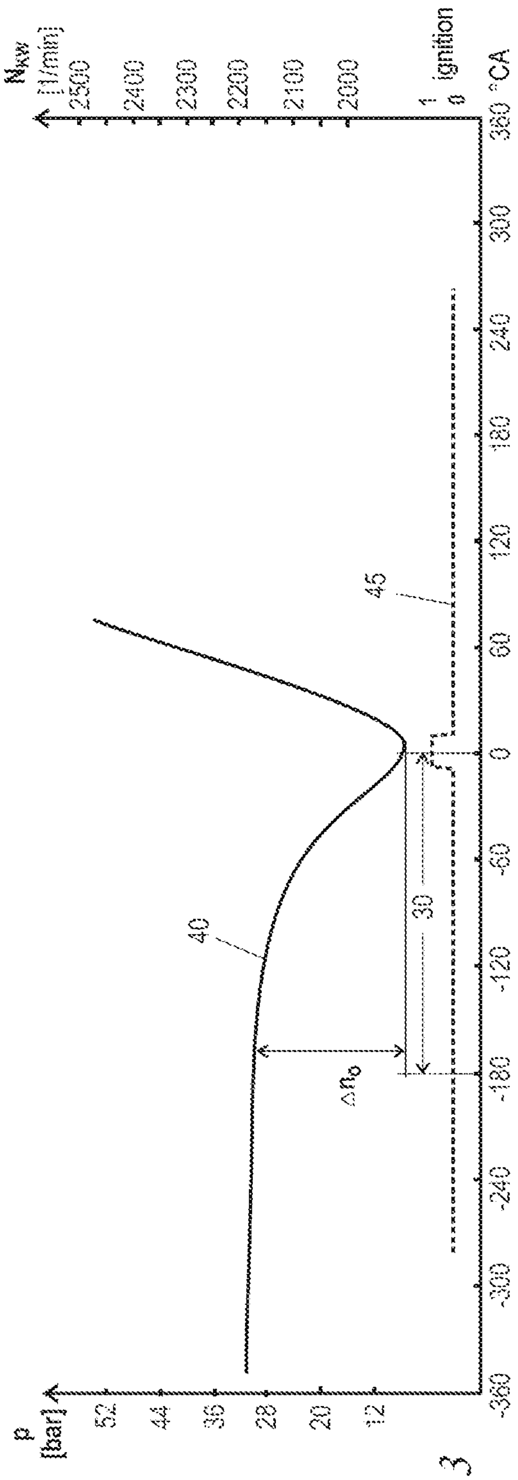
FIG. 3 shows the rotational speed profile of the crankshaft over the crankshaft angle when the throttle flap is open; and, FIG. 4 shows the rotational speed profile of the crankshaft over consecutive cycles of the combustion engine with a transition from a closed throttle flap (idling) to an open throttle flap (acceleration).

FIG. 3 illustrates the rotational speed profile 40 in the acceleration situation of the combustion engine 2. At full load of the combustion engine, the rotational speed is 7000 RPM to 11000 RPM. The maximum rotational speed is 8000 RPM to 15000 RPM. If, in the idling situation, the throttle flap 11 is pivoted into the open position of the throttle flap 11', for example by pressing down the positioning element 13 in the handle 14 of the work apparatus 1, the intake channel 7 is completely opened. When the intake channel 7 is completely opened, a large amount of combustion air can flow into the compression chamber 4, the combustion air being fed a corresponding large amount of fuel in order to form an ignitable fuel/air mixture. The amount of combustion air flowing into the combustion chamber 4 in the open position of the throttle flap 11' is larger than the amount of combustion air flowing into the combustion chamber 4 in the idling situation of the combustion engine 2. The amount of combustion air in flowing in the open position of the throttle flap 11' is in particular a multiple of the amount of combustion air flowing to the combustion engine 2 in the idling situation.

The greater amount of combustion air supplied to the combustion chamber 4 in the acceleration situation leads to a greater cylinder filling, that is, greater amounts of a fuel/air mixture are located in the combustion chamber, as a result of which the compression work of the piston 6 increases. This greater compression work of the piston 6 leads—as the rotational speed profile 40 in FIG. 3 shows—to a significant drop in the rotational speed N of the crankshaft 9. On its way from the bottom dead center BDC in the direction 50 of the top dead center TDC, a drop in rotational speed $\Delta_n$ occurs, which is illustrated in FIG. 3 as $\Delta_{nO}$. The drop in rotational speed $\Delta_{nO}$ occurring when the throttle flap 11 is open is significantly greater than the drop in rotational speed $\Delta_{nclosed}$ occurring in the idling situation when the throttle flap 11 is closed. The greater drop in rotational speed $\Delta_{nclosed}$ occurring because of the greater compression work performed can have a value of, for example, 260 RPM. If the large amount of fuel/air mixture located in the combustion chamber 4 in the acceleration situation is ignited in the region of the top dead center TDC, a large increase in rotational speed beyond the idling rotational speed takes place. The control circuit 19 controls the ignition time IT of the spark plug 21 in accordance with the advantageously predetermined ignition time $IT_A$ for the acceleration situation.

According to the disclosure, provision is made, in the idling situation of the combustion engine 2, to monitor the profile of the rotational speed N of the crankshaft 9 in the compression stroke over a predetermined crankshaft angle range 30. Advantageously, the monitoring of the rotational speed for switching over the ignition time is provided in a rotational speed range relevant to the idling of approximately 1500 RPM to 3500 RPM.

When the throttle flap 11 is closed, the drop in rotational speed $\Delta_{nclosed}$ occurring in the compression stroke in the predetermined crankshaft angle range 30 is detected as a value. The drop in rotational speed $\Delta_{nclosed}$ is indicated in the ignition circuit 20 as a drop in rotational speed $\Delta_n$ of a monitoring circuit 23, and the value of the detected drop in rotational speed $\Delta_n$ supplied to a comparator 24. The comparator 24 compares the value of the drop in rotational speed $\Delta_n$ detected in the predetermined crankshaft angle range 30 directly with a predetermined limit value $\Delta_{nL}$ which advantageously is stored in the comparator 24. The value of such a limit value $\Delta_{nL}$ can be, for example, a constant of 200 RPM.

If the throttle flap 11 is opened, the piston 6 has to perform greater compression work because of the greater filling of the combustion chamber 4, and therefore a greater drop in rotational speed $\Delta_{nO}$ occurs in the monitored crankshaft angle range 30 (FIG. 3).

Figure 4:
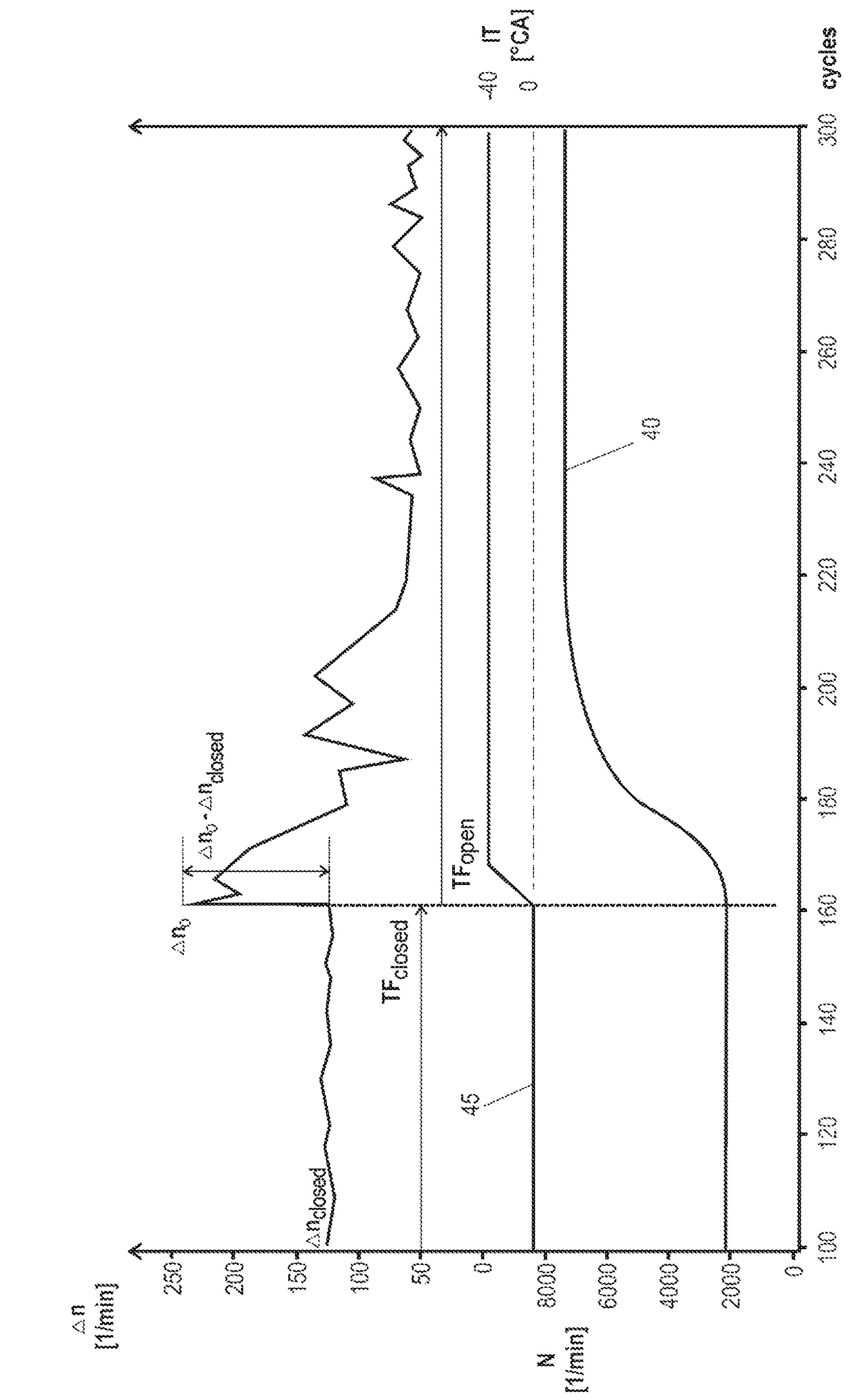

If the detected value of the drop in rotational speed Δn, that is, the drop in rotational speed $\Delta n_o$ in the case of the opened throttle flap 11 (FIG. 3), is equal to or greater than the predetermined limit value $\Delta n_L$, the comparator 24 outputs a signal on the control line 25. If the control circuit 19 receives the signal from the comparator 24, the control circuit immediately switches over to an ignition time $IT_A$ for the acceleration situation. This is schematically reproduced in FIG. 4.

The predetermined drop in rotational speed $\Delta n_L$ provided as a limit value is advantageously compared directly with the current drop in rotational speed Δn or $\Delta n_o$ or $\Delta n_{closed}$. It can be advantageous to form a sliding mean of the drop in rotational speed Δn over a plurality of working cycles, for example, over 2 to 5, in particular 3 working cycles. The predetermined limit value of the drop in rotational speed $\Delta n_L$ is selected in such a manner that, in the event of rotational speed noises, switching over to the ignition time for acceleration is avoided.

It may also be advantageous to compare a predetermined limit value of the drop in rotational speed $\Delta n_L$ with the difference of a determined current drop in rotational speed $\Delta n_n$ of a first working cycle minus the drop in rotational speed $\Delta n_{n-1}$ of a preceding working cycle. In particular, the drop in rotational speed $\Delta n_{n-1}$ of a preceding working cycle can also be provided as a sliding mean. Thus, the drop in rotational speed $\Delta n_{n-1}$ of a preceding working cycle can be averaged from the mean of, for example, 2 to 5 preceding working cycles, in particular 3 working cycles. It is thus possible for individual rogue results or noises to be smoothed. The limit value of the drop in rotational speed $\Delta n_L$ can advantageously be selected to be closer to zero.

It may also be advantageous to form the limit value of the drop in rotational speed $\Delta_{nL}$ from a sliding mean of the drop in rotational speed $\Delta_{nn-i}$ from preceding working cycles plus the addition of a jump in rotational speed of, for example, 100 RPM. As a result, the function becomes less dependent on the rotational speed in the idling situation, which may vary from engine to engine or depending on the idling setting.

The acceleration situation of the combustion engine 2 can be identified significantly earlier before the acceleration situation can be recognized on the basis of the increase in rotational speed of the crankshaft 9. The reaction of the combustion engine 2 to opening of the throttle flap 11, 11' takes place significantly more rapidly than in the event of a controller which switches over to an ignition time IT for the acceleration situation on the basis of an increase in rotational speed.

It is understood that the foregoing description is that of the preferred embodiments of the invention and that various changes and modifications may be made thereto without departing from the spirit and scope of the invention as defined in the appended claims.

The invention claimed is:

1. An ignition circuit for a combustion engine defining a combustion chamber, said combustion engine including:

- a spark plug arranged in said combustion chamber and a piston delimiting said combustion chamber;
- said piston being movable in a reciprocating manner between top dead center and bottom dead center;
- a crankshaft and a connecting rod connecting said piston to said crankshaft to facilitate rotation of said crankshaft via said connecting rod; and,
- an intake channel having a control element for apportioning combustion air for an idle situation and an acceleration situation of said combustion engine;
- said ignition circuit comprising:
- an electronic control circuit configured to trigger an ignition spark at said spark plug in dependence upon a crankshaft angle (CA) of said crankshaft at an ignition time (IT);
- said control circuit being provided with at least one ignition time point (IT) for said idle situation and at least one ignition time point (ITA) for said acceleration situation;
- said control circuit being configured, in said idle situation, to set the predetermined idle time point (IT) for said idle situation; and,
- said control circuit being further configured, in said idle situation, to monitor the course of a rotational speed (N) of said crankshaft over at least one predetermined crankshaft angle range, wherein a compression stroke of said combustion engine at least partially lies in said at least one predetermined crankshaft angle range, and, in said idle situation, to detect a drop in rotational speed ($\Delta$n), occurring within said at least one predetermined crankshaft angle range, in said rotational speed (N) of said crankshaft as a value, and being configured to compare said value of said detected drop in rotational speed ($\Delta$n) with a predetermined value of a drop in rotational speed ($\Delta n_L$) and, when said predetermined value ($\Delta n_L$) of said drop in rotational speed ($\Delta$n) is exceeded, to switch over to said ignition time point ($IT_A$) for said acceleration situation.

2. The ignition circuit of claim 1, wherein said control circuit is active at least in a rotational speed range of 1500 RPM to 3500 RPM.

3. An ignition circuit for a combustion engine defining a combustion chamber, said combustion engine including:

- a spark plug arranged in said combustion chamber and a piston delimiting said combustion chamber;
- said piston being movable in a reciprocating manner between top dead center and bottom dead center;
- a crankshaft and a connecting rod connecting said piston to said crankshaft to facilitate rotation of said crankshaft via said connecting rod; and,
- an intake channel having a control element for apportioning combustion air for an idle situation and an acceleration situation of said combustion engine;
- said ignition circuit comprising:
- an electronic control circuit configured to trigger an ignition spark at said spark plug in dependence upon a crankshaft angle (°CA) of said crankshaft at an ignition time (IT);
- said control circuit being provided with at least one ignition time point (IT) for said idle situation and at least one ignition time point (ITA) for said acceleration situation;
- said control circuit being configured, in said idle situation, to set the predetermined idle point (IT) for said idle situation;
- said control circuit being further configured, in said idle situation, to monitor the course of a rotational speed (N) of said crankshaft over at least one predetermined crankshaft angle range and, in said idle situation, to detect a drop in rotational speed ($\Delta$n), occurring within said at least one predetermined crankshaft angle range, in said rotational speed (N) of said crankshaft as a value, and being configured to compare said value of said detected drop in rotational speed ($\Delta$n) with a predetermined value of a drop in rotational speed ($\Delta n_L$) and, when said predetermined value ($\Delta n_L$) of said drop in rotational speed ($\Delta$n) is exceeded, to switch over to said ignition time ($IT_A$) for said acceleration situation; and wherein said at least one predetermined crankshaft angle range extends over a crankshaft angle (CA) of up to 300°.

4. The ignition circuit of claim 1, wherein said at least one predetermined crankshaft angle range extends over a crankshaft angle (°CA) of not more than 180°CA.

5. The ignition circuit of claim 1, wherein, said crankshaft has a rotational direction and said at least one predetermined crankshaft angle range extends at least between the bottom dead center of the piston and at least the top dead center of the piston in said rotational direction.

6. The ignition circuit of claim 1, wherein said at least one predetermined crankshaft angle range extends at least as far as said ignition time (IT).

7. The ignition circuit of claim 1, wherein said combustion engine is a four-stroke engine.

8. The ignition circuit of claim 1, wherein said control circuit is configured to detect a drop in rotational speed ($\Delta$n) occurring in a plurality of combustion cycles of said combustion engine and is configured to derive the value of said predetermined drop in rotational speed ($\Delta n_L$) from a mean of the detected values of the drop in rotational speed ($\Delta$n).

9. A method for switching over an ignition time in a spark-ignition combustion engine having a spark plug arranged in a combustion chamber of the combustion engine, and a piston which compresses a fuel/air mixture, supplied to the combustion chamber, on its way from bottom dead center to top dead center, wherein the supplied combustion air is apportioned with a control element via an intake channel in dependence on an operating state of the combustion engine, wherein the method comprises the steps of:

- detecting a drop in rotational speed (Δn) occurring during a compression stroke in an idle situation of the combustion engine;
- comparing the detected drop in rotational speed (Δn) to a predetermined drop in rotational speed ($\Delta n_L$); and,
- making a switch over to an ignition time for an acceleration situation when the detected drop in rotational speed (Δn) exceeds the predetermined drop in rotational speed ($\Delta n_L$).

10. The method of claim 9, wherein the drop in rotational speed (Δn) is detected in a crankshaft angle range of up to 300°.

11. The method of claim 9, wherein the drop in rotational speed (Δn) is detected in a crankshaft angle range of at least between the bottom dead center of the piston and at least the top dead center of the piston.

12. The method of claim 9, wherein the value of the predetermined drop in rotational speed ($\Delta n_L$) is formed from a mean of a sum of preceding drops in rotational speed (Δn).

13. The method of claim 9, wherein the drop in rotational speed (Δn) is detected at least in a rotational speed range of 1500 RPM to 3500 RPM.

* * * * *